United States Patent
Kim

(10) Patent No.: US 7,742,915 B2
(45) Date of Patent: Jun. 22, 2010

(54) APPARATUS AND METHOD FOR TRANSMITTING AND RECEIVING DATA IN A MOBILE COMMUNICATION TERMINAL

(75) Inventor: Jae-Eung Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 916 days.

(21) Appl. No.: 11/550,996

(22) Filed: Oct. 19, 2006

(65) Prior Publication Data
US 2007/0123203 A1    May 31, 2007

(30) Foreign Application Priority Data
Oct. 20, 2005   (KR) .................... 10-2005-0099347

(51) Int. Cl.
*G10L 21/00* (2006.01)
(52) U.S. Cl. .................................... 704/215
(58) Field of Classification Search ............... 704/215
See application file for complete search history.

(56) References Cited

U.S. PATENT DOCUMENTS

| | | | |
|---|---|---|---|
| 6,205,190 B1 * | 3/2001 | Antonio et al. | 375/346 |
| 6,377,570 B1 * | 4/2002 | Vaziri et al. | 370/352 |
| 6,418,147 B1 * | 7/2002 | Wiedeman | 370/468 |
| 6,671,272 B2 * | 12/2003 | Vaziri et al. | 370/352 |
| 6,680,972 B1 * | 1/2004 | Liljeryd et al. | 375/240 |
| 6,714,597 B1 * | 3/2004 | Antonio et al. | 375/296 |
| 6,925,116 B2 * | 8/2005 | Liljeryd et al. | 375/240 |
| 7,054,805 B2 * | 5/2006 | Rambo et al. | 704/201 |
| 7,277,849 B2 * | 10/2007 | Streich et al. | 704/229 |
| 7,283,955 B2 * | 10/2007 | Liljeryd et al. | 704/219 |

FOREIGN PATENT DOCUMENTS

KR    10-2005 0090799    12/2002

OTHER PUBLICATIONS

U.S. Appl. No. 11/461,012 to Lee, filed Jul. 31, 2006.
U.S. Appl. No. 11/468,487 to Kim, filed Aug. 30, 2006.
U.S. Appl. No. 11/469,063 to Ahn et al., filed Aug. 31, 2006.
U.S. Appl. No. 11/548,416 to Kim, filed Oct. 11, 2006.
U.S. Appl. No. 11/550,950 to Cho, filed Oct. 19, 2006.
English language Abstract of KR 10-2002-0090799.

* cited by examiner

*Primary Examiner*—Susan McFadden
(74) *Attorney, Agent, or Firm*—KED & Associates, LLP

(57) ABSTRACT

An apparatus for transmitting data from a mobile communication terminal includes an audio codec which converts a voice signal into digital voice data, a detection unit which detects a pause in the digital voice data, and a modulator/demodulator which modulates a signal with non-voice data, converts the modulated signal into an analog non-voice signal, and outputs the analog non-voice signal to the audio codec during the pause in the digital voice data.

20 Claims, 4 Drawing Sheets

APPARATUS AND METHOD FOR TRANSMITTING AND RECEIVING DATA IN A MOBILE COMMUNICATION TERMINAL

This application claims the benefit of Korean Patent Application No. 10-2005-0099347, filed on Oct. 20, 2005, which is hereby incorporated by reference in its entirety.

BACKGROUND

1. Field of the Invention

The present invention relates to a mobile communication terminal and, more particularly, to mobile communication terminal which is capable of transmitting and receiving non-voice data during a voice call.

2. Background of the Invention

Generally, a mobile communication terminal is a portable device which performs wireless communication. Wireless communication is typically performed by communicating with a base station in a service area, which is connected to a mobile switching center (MSC) that switches traffic. A conventional mobile communication terminal can perform voice communication, data communication (e.g., communication of symbols, numbers and characters) and/or multimedia communication (e.g., communication of images). Some recently developed mobile communication terminals include a camera, and have the capability of transmitting video in real time.

A conventional method of performing voice communication is described below.

The method begins by a mobile communication terminal receiving voice signals from a user through a microphone of the mobile communication terminal, and outputting the voice signals to an audio codec in the mobile communication terminal. Alternatively, previously stored voice signals may be outputted to the audio codec.

The audio codec then converts the voice signals to digital signals, codes the digital signals using pulse code modulation (PCM), and outputs the coded signals to a vocoder of a central processing unit (CPU) for processing. An output of the vocoder is then transmitted to a recipient mobile communication terminal.

When the recipient mobile communication terminal receives the transmission signals, they are processed by a vocoder of the recipient mobile communication terminal. The vocoder then outputs signals to an audio codec of the recipient mobile communication terminal.

The audio codec performs PCM decoding on the signals output by the vocoder, and converts the decoded signals into analog voice signals. The analog voice signals are then output through a speaker of the recipient mobile communication terminal.

One shortcoming of the conventional mobile communication terminal described above is that, during a voice call, the mobile communication terminal is not capable of transmitting or receiving data other than voice signals (such as, for example, image data or text data).

SUMMARY

One of the features of the present invention is that it allows non-voice data to be transmitted in the same communication channel as voice data during a voice communication.

To achieve at least these features, there is provided an apparatus for transmitting data from a mobile communication terminal which includes an audio codec which converts a voice signal into digital voice data, a detection unit which detects a pause in the digital voice data, and a modulator/demodulator which modulates a signal with non-voice data, converts the modulated signal into an analog non-voice signal, and outputs the analog non-voice signal to the audio codec during the pause in the digital voice data.

The audio codec may include a switch which selectively switches the voice signal and the analog non-voice signal to the codec based on the detection of the pause in the digital voice data. The audio codec may convert the analog non-voice signal into digital non-voice data during the pause in the digital voice data. The apparatus may also include a buffer which temporarily stores the non-voice data.

The audio codec may include an amplifier which amplifies the voice signal, a switch which switches between the amplified voice signal and the analog non-voice signal, an A/D converter which converts the amplified voice signal to digital voice data and converts the analog non-voice signal to digital non-voice data, a filter which filters the converted digital voice data and the converted digital non-voice data, and a Pulse Code Modulation (PCM) compander which compresses the filtered voice data and filtered non-voice data using PCM coding. The modulator/demodulator may include a modulator which modulates the signal with the non-voice data during the pause in the digital voice data, a D/A converter which converts the modulated signal into the analog non-voice signal, a filter which filters the analog non-voice signal, and a Low Pass Filter which limits a frequency band of the filtered analog non-voice signal.

There is also provided an apparatus for receiving data in a mobile communication terminal which includes a detector which detects the presence of non-voice data in a received data stream, an audio codec which converts the non-voice data into an analog non-voice signal, and a modulator/demodulator which converts the analog non-voice signal into digital non-voice data when the presence of the non-voice data is detected in the received data stream, and demodulates the converted digital non-voice data. The audio codec may include a switch which selectively switches an output to the modulator/demodulator based on the detected presence of the non-voice data in the received data stream. The modulator/demodulator may convert the analog non-voice signal into the digital non-voice data when the switch switches the output to the modulator/demodulator, and output the demodulated non-voice data to a display unit.

The audio codec may output a voice signal to a speaker. The apparatus may include a buffer which temporarily stores the received data stream. The audio codec may include a PCM expander which expands the received data using PCM decoding, a Low Pass Filter which limits a frequency band of the decoded received data, a D/A converter which converts the frequency band-limited data into an analog signal, and a switch which switches a path of the converted analog signal. The modulator/demodulator may include a Low Pass Filter which limits a frequency band of the analog non-voice signal, an A/D which converts the frequency band-limited non-voice signal into digital non-voice data, and a demodulator which demodulates the digital non-voice data.

There is also provided a method for transmitting data from a mobile communication terminal which includes converting, by an audio codec, a voice signal into digital voice data, detecting a pause in the digital voice data, and modulating a signal with non-voice data, converting the modulated signal into an analog non-voice signal, and outputting the analog non-voice signal to the audio codec during the pause in the digital voice data.

The method may also include converting, by the audio codec, the analog non-voice signal into digital non-voice data, and selectively outputting the digital voice data and the digital non-voice data to a Central Processor Unit based on whether the pause in the digital voice data is detected.

There is also provided a method for receiving data in a mobile communication terminal which includes detecting the presence of non-voice data in a received data stream, converting the non-voice data into an analog non-voice signal, converting the analog non-voice signal into digital non-voice data when the presence of the non-voice data is detected in the received stream, and demodulating the converted digital non-voice data.

The non-voice data may include one of image data and text data. The method may include outputting the demodulated digital non-voice data to a display unit. The method may also include converting voice data from the received data stream into an analog voice signal, and outputting the analog voice signal to a speaker.

There is also provided a mobile communication terminal which includes a transceiver which transmits and receives voice data, an audio codec which processes voice data, and a processor that cooperates with the audio codec to insert non-voice data between certain portions of voice data transmitted by the transceiver and to detect non-voice data inserted between certain portions of the received voice data, such that the non-voice data is transmitted and received together with the voice data through a single voice communication channel.

The processor may include a modulator/demodulator which modulates a signal with the non-voice data to allow insertion of the non-voice data between voice data, and demodulates non-voice data inserted between voice data. The processor further may also include an input unit which receives user input, and a detector which detects pauses in the voice data to be transmitted. The detector may compare sound characteristics of a user's voice with sound characteristics of other sounds picked up by the input unit.

The sound characteristics of the user's voice may relate to at least one of amplitude, frequency, pitch, tone, intonation and speed of speech. The processor may include a buffer which temporarily stores the received user input to allow the detector to detect the pauses in the voice data. The processor may also include a text processor which receives text data from a user via the input unit, and cooperates with the modulator/demodulator and the detector to insert at least a portion of the received text data during the pauses in the voice data.

The terminal may include a storage unit which stores the received text data for subsequent retrieval. The non-voice data may include text. The terminal may also include a screen which displays the non-voice data to allow viewing by a user while a voice call is in progress.

Other exemplary embodiments and features of the present invention may be ascertained by reviewing the present disclosure and the accompanying drawings.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION

Figure 1:
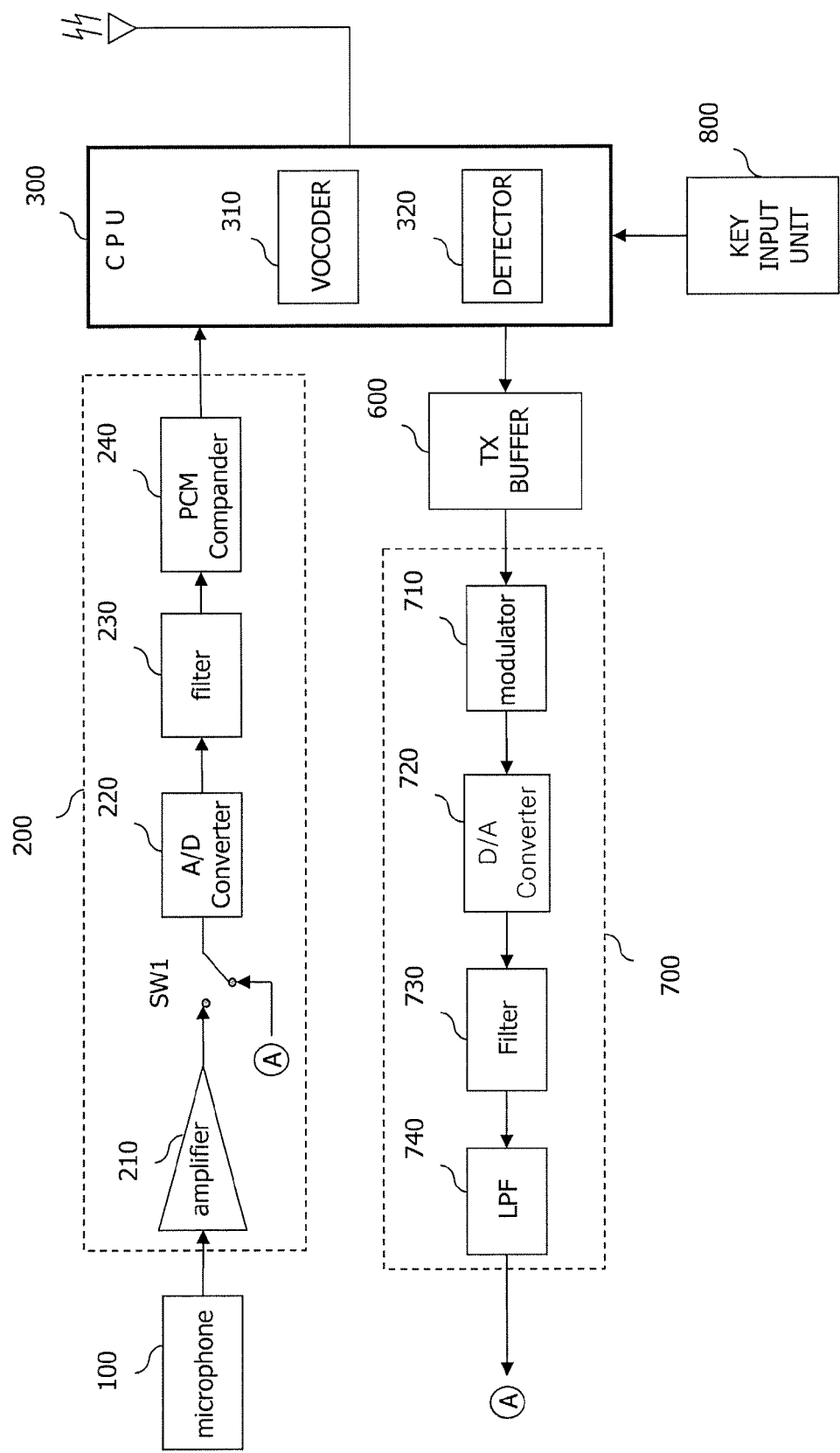
FIG. 1 is a schematic block diagram showing an apparatus for transmitting data from a mobile communication terminal according to an aspect of the present invention.

Described below is a mobile communication terminal, which may be a cellular phone, a handset, a PDA, a laptop, or other like electronic communication device.

Hereafter, voice data (signals) refers to the content of actual spoken words provided by a user through a microphone (or other voice and/or sound pick up device) of a mobile communication terminal. This can be detected in a variety of ways. For example, the amplitude and/or frequency characteristics of the user's voice may be detected. Such characteristics of the user's voice may be initially stored by requesting the user to provide samples of his normal speaking voice. Adaptive software may be used to train a processor (or other components) in the mobile communication terminal to recognize typical voice patterns of the user. For more accurate determination of the user's voice characteristics, additional factors, such as voice pitch, tone, intonation, speed, etc., may also be considered.

Sometimes, the owner of a mobile communication terminal may wish to allow another person to use his terminal under certain circumstances, such as when the user lends his terminal to a friend. In these circumstances, the function that allows the mobile communication terminal to detect the user's voice pattern may be selectively activated or deactivated by the user.

After an appropriate amount of user voice samples are obtained, the processor is able to distinguish (with relative accuracy) the characteristics of the user's voice from background noise or other sounds that are also picked up by the mobile communication terminal microphone.

When the user's voice can be distinguished in such manner, instances where the user pauses or momentary stops speaking into the mobile phone microphone (e.g., discontinuous intervals) can be determined with some degree of accuracy. Here, the sensitivity in which the user's voice patterns are recognized can be adjusted accordingly, in order to determine certain intervals or pauses during the user's conversation. For example, a highly sensitive detection setting may allow detection of short pauses, while a low sensitive detection setting may only be able to detect relatively long pauses.

The present invention utilizes the intervals or pauses in a user's speech to transmit data, other than voice data (such as, for example, text or images). By doing so, non-voice data can share a communication channel with voice data.

Here, the non-voice data may be data which has been previously received and stored in the mobile terminal. For example, the user may enter a text reminder message to be sent to a particular recipient, and later, when a call is placed to that recipient, the non-voice data (pre-stored reminder message) may be inserted into appropriate portions of the voice signal, which is buffered before transmission.

Alternatively, the non-voice data may be inputted while a voice call is in progress. For example, when the user places a call to a recipient, the user may compose a text message during the conversation. In this regard, the user may use an ear-piece or other hands-free device that allows him to simultaneous converse and input a text message. The mobile communication terminal can immediately insert sequential portions of the text message into detected pauses or intervals of the user's speech upon receiving the text inputs from the user.

The voice signals may first be temporarily stored in a buffer (or other memory) to allow appropriate detection of the pauses or intervals in the voice signals, and insertion of non-voice data into the pauses or intervals in the voice signals. Namely, as the user speaks into his mobile communication terminal, the voice signals may be temporarily buffered before being transmitted. This may result in a slight delay in transmitting the voice call to a recipient. However, due to ongoing improvements in data processing power, buffering techniques, and the like, any such delay may be difficult to notice by a user. Alternatively, the non-voice data (or portions thereof) may be immediately inserted as pauses or intervals in the voice signals are being detected. Additionally, other schemes or techniques for detecting the pauses or intervals in the user's inputted voice and inserting non-voice data into those detected portions of the voice signal may be employed, as would be clearly understood by those skilled in the art.

Various types of non-voice data can be inserted in the intervals of the voice signals. For example, to perform noise cancellation (or minimize background noise that a listener may otherwise hear), certain audio signals with the appropriate amplitude and/or frequency that approximately match surrounding background noise may be generated and inserted into these intervals to cancel out undesirable noise components in sounds picked up by the mobile communication terminal microphone. As a result, the listener would hear less background noise during his conversation.

As another example, content data, such as, for example, text or images, may be inserted into these intervals, and then sent together with voice signals to a recipient. For example, if the inserted data is part of a text message or text reminder, the inserted text data can be displayed on the recipient's mobile phone display while a voice call is in progress, such as when using an earpiece (or other hands-free device) that allows him to view his screen while talking.

If a conversation ends before the mobile communication terminal transmits all of the non-voice data the user intends to send, the mobile communication terminal may include an additional function which allows the user to send the remaining portion of the non-voice data after the conversation has terminated. In this regard, the mobile communication terminal may continue to communicate with the recipient's mobile communication terminal after the user's conversation has ended, to allow the remaining non-voice data to be transmitted to the recipient. In this case, the user may be notified (or warned) that the transmission of the non-voice data has not yet been completed. Alternatively, the mobile communication terminal may be set to maintain a communication link even after the user's conversation has ended to allow the non-voice data transmission to be continued.

An exemplary apparatus and method for transmitting and receiving non-voice data during a voice communication according to the present invention is described below with reference to the accompanying drawings.

FIG. 1 is a schematic block diagram showing an apparatus for transmitting data from a mobile communication terminal according to an aspect of the present invention.

The apparatus shown in FIG. 1 includes: an audio codec 200 (or other appropriate audio data processing element) which converts inputted analog voice signals into digital voice data; a detector 320 which detects intervals in the voice data; a modulator/demodulator 700 (such as, for example, a Frequency Shift Keying (FSK) modulator/demodulator) which converts stored non-voice data into non-voice analog signals; and a processor 300 (such as, for example, a Central Processing Unit (CPU)) which controls the insertion of non-voice data into pauses or intervals in the voice signals. The mobile communication terminal may temporarily store inputted non-voice data in a TX buffer 600. Examples of the non-voice data include, but are not limited to, digital data such as image data or text data.

The audio codec 200 may include: a first amplifier 210 which amplifies the inputted voice signals; a first switch SW1 which switches between the amplified voice signals and the non-voice analog signals outputted from the modulator/demodulator 700; an A/D converter 220 which converts an output of the switch SW1 (i.e., either amplified voice signals or non-voice analog signals) into digital signals; a first filter 230 which filters the converted digital signals; and a PCM compander 240 which compresses the filtered signals. Other equivalent circuit elements or components may replace or supplement those mentioned above.

The modulator/demodulator 700 may include a modulator 710 which modulates signals with non-voice data to be transmitted; a D/A converter 720 which converts the modulated signals into analog signals; a second filter 730 which filters the analog signals outputted by the D/A converter 720; and a LPF 740 which limits a frequency band of the filtered analog signals. Other equivalent circuit elements or components may replace or supplement those mentioned above.

An exemplary method for transmitting data from a mobile communication terminal according to an aspect of the present invention is be described below with reference to FIG. 2.

Figure 2:
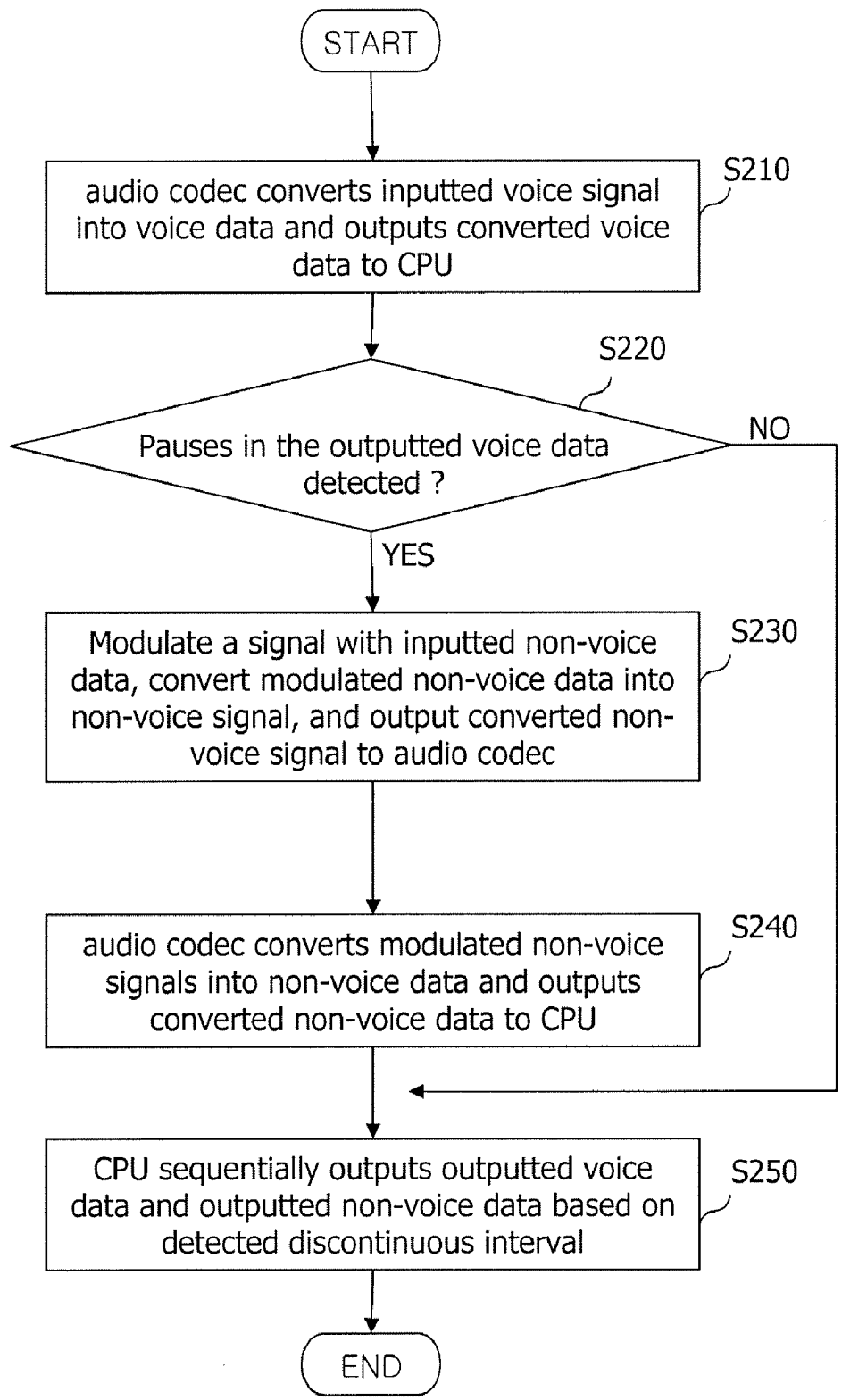
FIG. 2 is a flow chart illustrating an exemplary method for transmitting data from a mobile communication terminal according to an aspect of the present invention.

FIG. 2 is a flow chart illustrating an exemplary method for transmitting data from a mobile communication terminal according to an aspect of the present invention.

The method shown in FIG. 2 includes: converting, by an audio codec, inputted analog voice signals into digital voice data and outputting the converted voice data to a CPU (step S210); detecting, by a detector, a pause in the outputted voice data (step S220); when a pause is detected, modulating a signal with inputted non-voice data, converting the modulated non-voice data into an analog non-voice signal, and outputting the converted analog non-voice signal to the audio codec (step S230); converting, by the audio codec, the analog non-voice signals into digital non-voice data and outputting the converted non-voice data to the CPU (step S240); and sequentially outputting, by the CPU, the outputted voice data and the outputted non-voice data based on the detected pause (step S250).

The method shown in FIG. 2 is described in more detail below.

First, the mobile communication terminal receives voice signals through the microphone 100 (or other audio pick up device) from a user or retrieves previously stored voice signals from memory, and outputs analog voice signals to the audio codec 200.

Then, the audio codec 200 converts the analog voice signals into digital voice data and outputs the converted voice data to the CPU 300 (step S210). In this regard, the first amplifier 210 amplifies the analog voice signals and outputs the amplified voice signals through the first switch SW1. Then, the A/D converter 220 converts the amplified voice signals into digital voice data.

The first filter 230 filters the converted digital voice data, and the PCM compander 240 compresses the filtered voice data using PCM coding and the outputs the coded voice data to a vocoder 310 of the CPU 300.

The mobile communication terminal determines a pause has been detected in the voice data outputted from the audio codec 200 (step S220). In this regard, the detector 320 detects a pause in the voice data outputted from the audio codec 200 and informs the CPU 300. Then, the CPU 300 controls the first switch SW1 to switch to the modulator/demodulator 700 as an input, and receive non-voice data from the modulator/demodulator 700 as long as there remains a pause in the voice data.

When the pause in the voice data is detected, the modulator/demodulator 700 modulates a signal with the inputted non-voice data, converts the modulated signal into an analog non-voice signal, and outputs the converted non-voice signal to the audio codec 200 (step S230). The non-voice data may be input with a key input unit 800. In this regard, the modulator 710 modulates the signal with the inputted non-voice data, and the D/A converter 720 converts the non-voice data into an analog non-voice signal.

The second filter 730 filters the converted non-voice signal and outputs the filtered non-voice signal to the LPF 740. The LPF 740 limits the frequency band of the non-voice signal and outputs the frequency band-limited non-voice signal to the audio codec 200.

The audio codec 200 converts the analog non-voice signal into digital non-voice data, and outputs the converted non-voice data to the CPU (step S240).

The CPU may then selectively switch the first switch SW1 based on the pause in the detected voice data, and sequentially outputs the outputted voice data and the outputted non-voice data based on the detected pause (step S250). Accordingly, the mobile communication terminal can transmit non-voice data in a pause in the voice data, and thereby transmit the non-voice data during a voice communication.

An exemplary apparatus and method for receiving data in a mobile communication terminal is described below.

Figure 3:
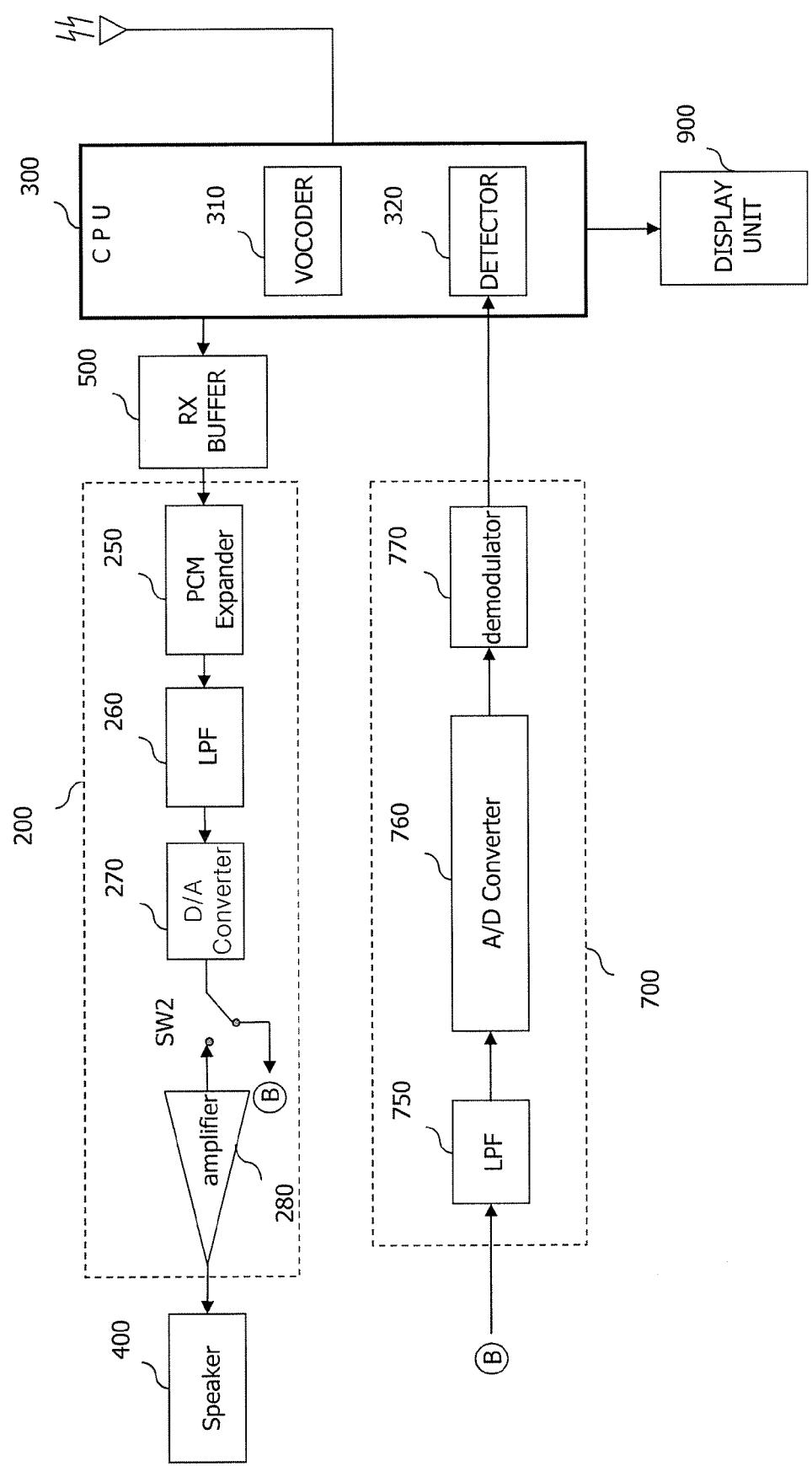
FIG. 3 is a schematic block diagram showing an apparatus for receiving data in a mobile communication terminal according to an aspect of the present invention.

FIG. 3 is a schematic block diagram showing an apparatus for receiving data in a mobile communication terminal according to an aspect of the present invention.

The apparatus shown in FIG. 3 includes: a detector 320 which detects the presence of non-voice data in a received data stream; an audio codec 200 which converts digital data from the received data stream into analog signals; a modulator/demodulator 700 (such as, for example, an FSK modulator/demodulator) which converts analog non-voice signals which are outputted from the audio codec 200 into digital non-voice data and demodulates the converted non-voice data; and a CPU 300 which controls the separation of voice data from non-voice data based on the detection of non-voice data by the detector 320. The mobile communication terminal temporarily stores the received data stream in a reception (RX) buffer 500.

The audio codec 200 may include a PCM expander 250 which expands the received data using PCM decoding; a LPF 260 which limits a frequency band of the decoded (expanded) received data; a D/A converter 270 which converts the frequency band-limited data into an analog signal; a switch SW2 which switches the converted analog signal according to the detection of voice data; and an amplifier 280 which amplifies an analog voice signal.

The modulator/demodulator 700 may include a LPF 750 which limits the frequency band of an analog non-voice signal outputted by audio codec 200; an A/D converter 760 which converts the frequency band-limited analog non-voice signal into digital non-voice data; and a demodulator 770 which demodulates the converted non-voice data.

An exemplary method for receiving data in a mobile communication terminal is described below with reference to FIG. 4.

Figure 4:
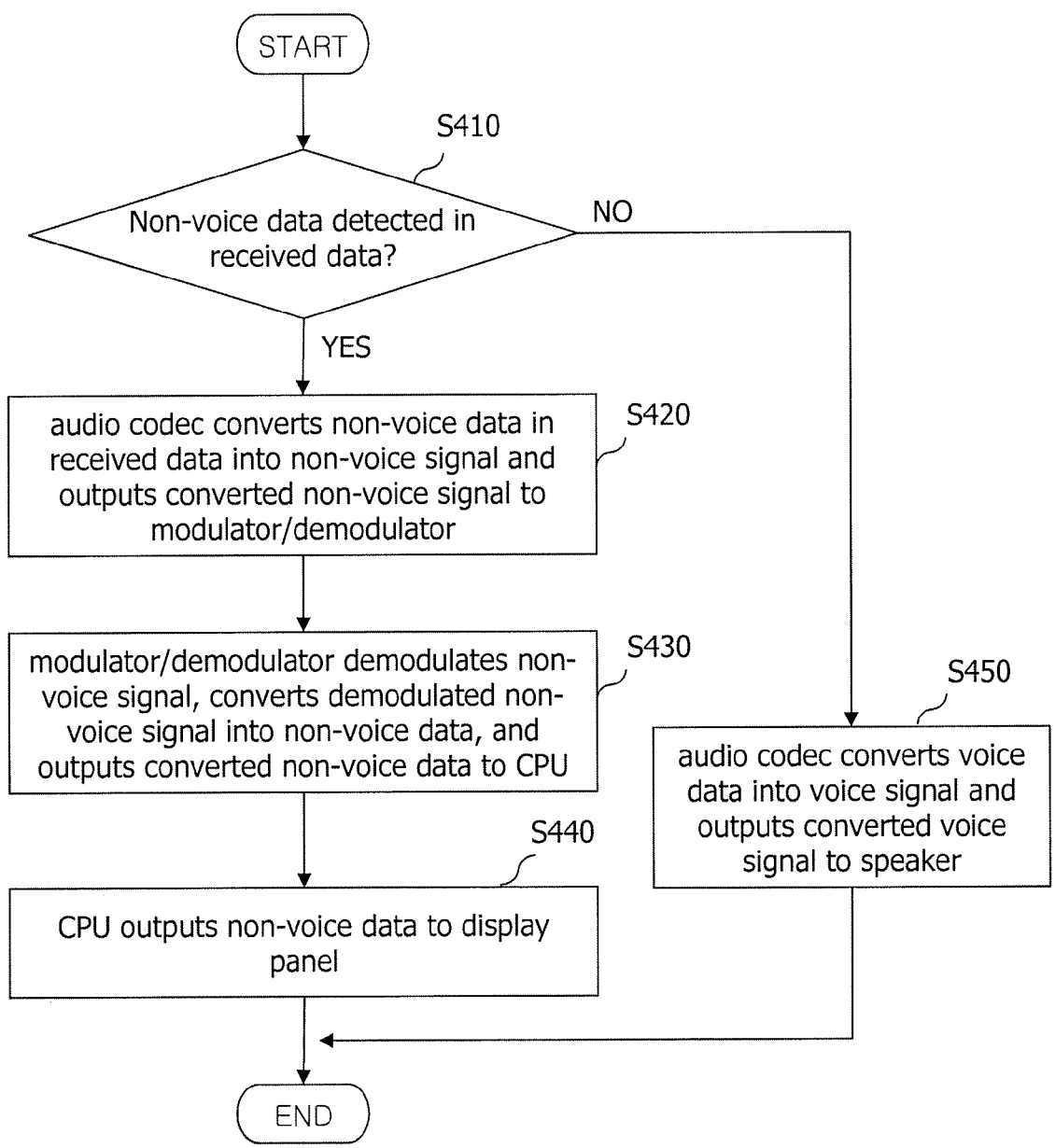
FIG. 4 is an exemplary flow chart illustrating a method for receiving data in a mobile communication terminal according to an aspect of the present invention.

FIG. 4 is an exemplary flow chart illustrating a method for receiving data in a mobile communication terminal according to an aspect of the present invention.

The method shown in FIG. 4 includes: detecting, by a detector, the presence of non-voice data in a received data stream (step S410); when non-voice data is detected, converting, by an audio codec, non-voice data in the received data stream into an analog non-voice signal, and outputting the analog non-voice signal to a modulator/demodulator (step S420); converting, by the modulator/demodulator, the analog non-voice signal into non-voice data, demodulating the converted non-voice data, and outputting the demodulated non-voice data to a CPU (step S430); and outputting, by the CPU, the non-voice data to a display panel (step S440). When non-voice data is not detected from the received data stream, the mobile communication terminal converts voice data from the received data stream into an analog voice signal with the audio codec and outputs the converted voice signal to a speaker (step S450).

The mobile communication terminal can detect the presence of non-voice data in the received data stream by header information included in the data stream, for example.

The exemplary method for receiving the data in the mobile communication terminal is described in more detail below.

First, when a data stream is received, the mobile communication terminal temporarily stores the received data in the reception buffer 500 and then outputs the received data to the audio codec 200.

The PCM expander 250 then decodes the received data stream, and the LPF 260 limits the frequency band of the decoded data.

The D/A converter 270 converts the frequency-limited data into an analog signal. If the analog signal is a voice signal, the switch SW2 outputs the converted voice signal to the second amplifier 280.

The second amplifier 280 amplifies the voice signal and outputs the amplified voice signal to a speaker 400.

The detector 320 determines whether the received data stream is non-voice data (step S410), and informs the CPU 300 accordingly. If the received data stream is non-voice data, then the CPU 300 controls the switch SW2 to select the modulator/demodulator 700 as an output.

The audio codec 200 converts the received non-voice data to an analog non-voice signal and outputs the converted non-voice signal to the modulator/demodulator 700 (step S420). In this regard, the PCM expander decodes the received non-voice data, and outputs the decoded data to the LPF 260.

The LPF 260 limits the frequency band of the decoded non-voice data, and the D/A converter 270 converts the frequency band-limited non-voice data into a non-voice signal.

The detector 320 informs the CPU 300 when non-voice data is present in the received data stream, so that the CPU 300 can connect the switch SW2 to the modulator/demodulator 700 and output a non-voice signal during the reception of the non-voice data.

The modulator/demodulator 700 converts the non-voice signal to digital non-voice data, demodulates the non-voice data, and outputs it to the CPU 300 (step S430). In this regard, the LPF 750 limits the frequency band of the non-voice signal, and the A/D converter 760 converts the frequency band-limited non-voice signal into digital non-voice data.

The demodulator 770 demodulates the converted non-voice data and outputs the demodulated non-voice data to the CPU 300, whereby the CPU 300 can display the non-voice data on a display unit 900.

The apparatuses and methods described above advantageously allow non-voice data to be transmitted and received in the same communication channel as voice data during a voice communication call.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

In accordance with various embodiments of the present disclosure, the methods described herein may be implemented by software programs executable by a processor. The present disclosure contemplates a computer-readable medium that includes instructions or receives and executes instructions responsive to a propagated signal. The term "computer-readable medium" shall include any medium that is capable of storing, encoding or carrying a set of instructions for execution by a processor to perform any one or more of the methods or operations disclosed herein.

In a particular non-limiting, exemplary embodiment, the computer-readable medium can include a solid-state memory such as, for example, a memory card or other package that houses one or more non-volatile read-only memories. Further, the computer-readable medium may be a random access memory or other volatile re-writable memory. Accordingly, the disclosure is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus for transmitting data from a mobile communication terminal, comprising:
   an audio codec which converts a voice signal into digital voice data;
   a detection unit which detects a pause in the digital voice data; and
   a modulator/demodulator which modulates a signal with non-voice data, converts the modulated signal into an analog non-voice signal, and outputs the analog non-voice signal to the audio codec during the detected pause in the digital voice data, wherein the modulator/demodulator comprises:
      a modulator that modulates the signal with the non-voice data during the detected pause in the digital voice data,
      a D/A converter that converts the modulated signal into the analog non-voice signal,
      a filter that filters the analog non-voice signal, and
      a Low Pass Filter that limits a frequency band of the filtered analog non-voice signal.

2. The apparatus according to claim 1, wherein the audio codec includes a switch which selectively switches the voice signal and the analog non-voice signal to the codec based on the detection of the pause in the digital voice data.

3. The apparatus according to claim 1, wherein the audio codec converts the analog non-voice signal into digital non-voice data during the pause in the digital voice data.

4. The apparatus according to claim 1, further comprising:
   a buffer which temporarily stores the non-voice data.

5. The apparatus according to claim 1, wherein the audio codec comprises:
   an amplifier which amplifies the voice signal;
   a switch which switches between the amplified voice signal and the analog non-voice signal;
   an A/D converter which converts the amplified voice signal to digital voice data and converts the analog non-voice signal to digital non-voice data;
   a filter which filters the converted digital voice data and the converted digital non-voice data; and
   a Pulse Code Modulation (PCM) compander which compresses the filtered voice data and filtered non-voice data using PCM coding.

6. An apparatus for receiving data in a mobile communication terminal, comprising:
   a detector which detects a presence of non-voice data in a received data stream;
   an audio codec which converts the non-voice data into an analog non-voice signal; and
   a modulator/demodulator which converts the analog non-voice signal into digital non-voice data when the presence of the non-voice data is detected in the received data stream, and demodulates the converted digital non-voice data, wherein the audio codec outputs a voice signal to a speaker.

7. The apparatus according to claim 6, wherein the modulator/demodulator comprises:
  a Low Pass Filter which limits a frequency band of the analog non-voice signal;
  an A/D which converts the frequency band-limited non-voice signal into digital non-voice data; and
  a demodulator which demodulates the digital non-voice data.

8. The apparatus according to claim 6, wherein the audio codec comprises:
  a switch which selectively switches an output to the modulator/demodulator based on the detected presence of the non-voice data in the received data stream.

9. The apparatus according to claim 8, wherein the modulator/demodulator converts the analog non-voice signal into the digital non-voice data when the switch switches the output to the modulator/demodulator, and outputs the demodulated non-voice data to a display unit.

10. The apparatus according to claim 6, wherein the audio codec comprises:
  a PCM expander which expands the received data using PCM decoding;
  a Low Pass Filter which limits a frequency band of the decoded received data;
  a D/A converter which converts the frequency band-limited data into an analog signal; and a switch which switches a path of the converted analog signal.

11. The apparatus according to claim 6, further comprising:
  a buffer which temporarily stores the received data stream.

12. A method for transmitting data from a mobile communication terminal, comprising:
  converting, by an audio codec of the mobile communication terminal, a voice signal into digital voice data;
  detecting, by a detector of the mobile communication terminal, a pause in the digital voice data;
  modulating a signal with non-voice data, converting the modulated signal into an analog non-voice signal, and outputting the analog non-voice signal to the audio codec during the detected pause in the digital voice data; and
  transmitting data from the mobile communication terminal based at least on the analog non-voice signal output to the audio codec.

13. The method according to claim 12, further comprising:
  converting, by the audio codec, the analog non-voice signal into digital non-voice data; and
  selectively outputting the digital voice data and the digital non-voice data to a Processor Unit of the mobile communication terminal based on whether the pause in the digital voice data is detected.

14. A method for receiving data in a mobile communication terminal, comprising:
  receiving a data stream at the mobile communication terminal;
  detecting, by a detector of the mobile communication terminal, a presence of non-voice data in the data stream received by the mobile communication terminal;
  converting, by an audio codec of the mobile communication terminal, the non-voice data into an analog non-voice signal;
  converting, by a modulator/demodulator of the mobile communication terminal, the analog non-voice signal into digital non-voice data when the presence of the non-voice data is detected in the received stream;
  demodulating, by the modulator/demodulator of the mobile communication terminal, the converted digital non-voice; and
  converting voice data from the received data stream into an analog voice signal, outputting the analog voice signal to a speaker, and outputting the analog voice signal from the speaker.

15. The method according to claim 14, wherein the non-voice data comprises one of image data and text data.

16. The method according to claim 14, further comprising:
  outputting the demodulated digital non-voice data to a display unit.

17. A mobile communication terminal, comprising:
  a transceiver which transmits and receives voice data;
  an audio codec which processes voice data; and
  a processor that cooperates with the audio codec to insert non-voice data between certain portions of voice data transmitted by the transceiver and to detect non-voice data inserted between certain portions of the received voice data, such that the non-voice data is transmitted and received together with the voice data through a single voice communication channel, wherein the processor comprises:
  an input unit which receives user input, and
  a detector which detects pauses in the voice data to be transmitted, wherein the detector compares sound characteristics of a user's voice with sound characteristics of other sounds picked up by the input unit.

18. The terminal according to claim 17, wherein the sound characteristics of the user's voice relate to at least one of amplitude, frequency, pitch, tone, intonation and speed of speech.

19. The terminal according to claim 17, wherein the processor further comprises:
  a text processor which receives text data from a user via the input unit, and cooperates with the modulator/demodulator and the detector to insert at least a portion of the received text data during the pauses in the voice data.

20. The terminal according to claim 19, further comprising a storage unit which stores the received text data for subsequent retrieval.

* * * * *